Aug. 7, 1928.　　　　　　　　　　　　　　　1,680,170
E. F. PIERCE
LUBRICATING SYSTEM
Filed Aug. 6, 1923
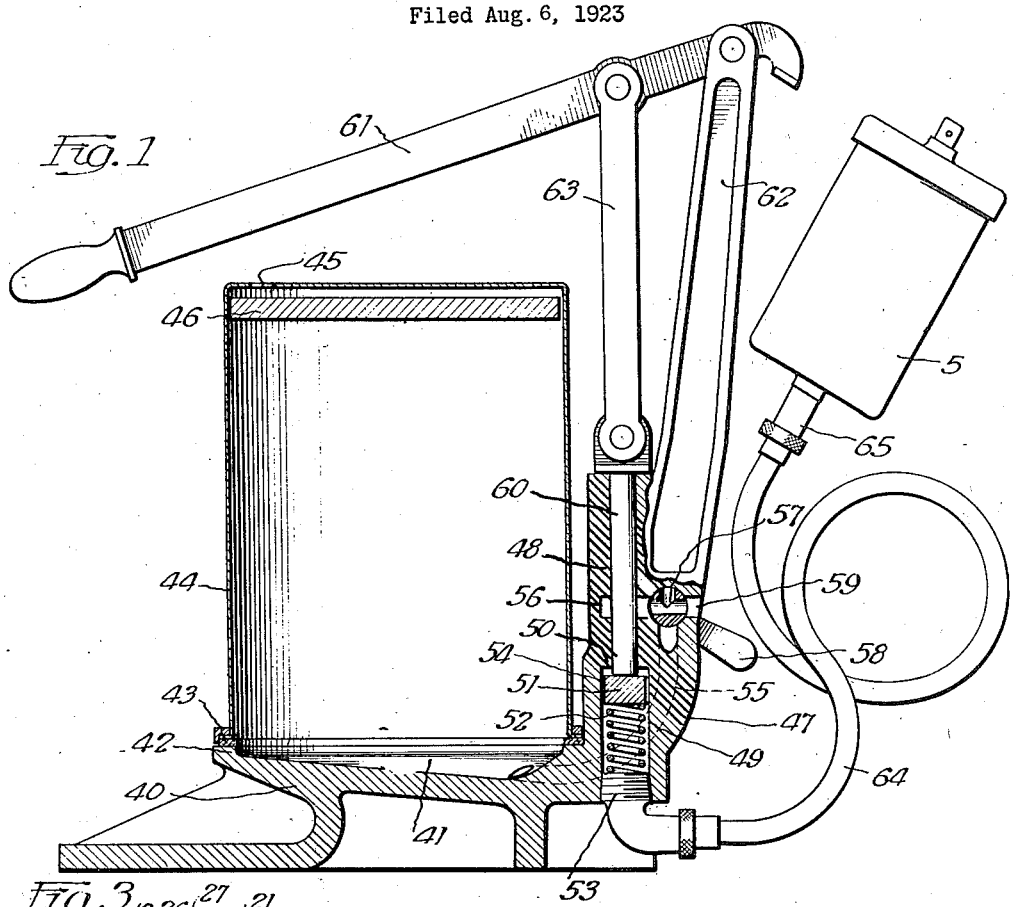
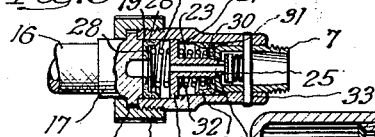
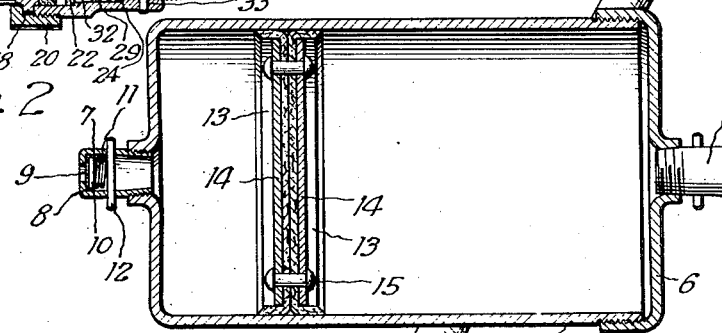
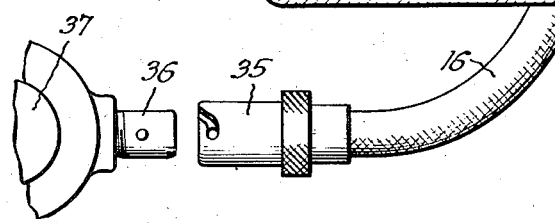
Inventor
Earl F. Pierce Patented Aug. 7, 1928.

1,680,170

UNITED STATES PATENT OFFICE.

EARL F. PIERCE, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed August 6, 1923. Serial No. 655,919.

My invention relates to improvements in lubricating systems, and is particularly concerned, though not necessarily limited, to improvements in that type of lubricating system which comprises a mechanism having a plurality of bearings, one or more of which are provided with nipples or fittings for receiving lubricant and conducting it to the bearing surfaces, in combination with a compressor having means for successively making sealed contact with said nipples or fittings, so that lubricant under comparatively high pressure can be forced into the fittings and between the bearing surfaces.

Such systems as heretofore constructed in general embody compressors of two different types, one a hand operated compressor in which the pressure upon the lubricant is generated by the rotation of a threaded piston rod, and the other a compressor embodying a motor operated pump. Where it is necessary to force lubricant into a bearing offering comparatively high resistance to the passage of lubricant therethough, it is sometimes difficult to manipulate the hand operated compressor, and the comparatively large cost of the motor operated compressor makes it impracticable for a person owning a single car or a small number of cars to make use of such compressor.

One of the objects of my invention is to provide a lubricating system embodying a modified form of compressor which embodies all of the advantages of a small portable hand compressor, but which at the same time eliminates all or much of the manual labor incident to the operation of the usual hand compressor.

Another object of my invention is to provide a lubricating system embodying a compressor having a form of cartridge container or barrel, in one end of which is stored the lubricant to be supplied to the bearings, and in the other end of which is stored a quantity of compressible fluid under comparatively high pressure, the fluid and the lubricant preferably being separated by a piston or other equivalent construction.

A still further object of my invention is to provide a cartridge of the character described which is reversible; that is, a cartridge in which the lubricant can be stored in either end and the compressible fluid in the other end.

Another object of my invention is to provide an article of manufacture and sale comprising a cartridge charged with suitable quantities of lubricant and compressible fluid, which cartridge is adapted to be charged by service stations and exchanged for the empty containers of previously used cartridges.

Other objects of my invention will appear as this description progresses, reference being had to the accompanying drawings, in which Figure 1 shows the cartridge forming a part of my improved compressor and lubricating system, connected with a compressor suitable for charging one end of the cartridge or container with lubricant and the other end with a fluid under compression. This compressor is illustrated in vertical central section;

Figure 2 is a view partially in elevation and partially in section, showing certain details of construction of my improved compressor and the manner in which it is used; and Figure 3 is a sectional detail of the coupling member which I prefer to use for making connection between the cartridge or container of my improved compressor with the compressor by which it is charged, and also for making connection between the cartridge and the flexible conduit which I use for conducting lubricant from the cartridge to a bearing.

Throughout the several views similar reference characters will be used for referring to similar parts.

Referring for the present to Figure 2, the improved compressor forming a part of my lubricating system comprises a cartridge or container 5 which is preferably cylindrical in shape. This cartridge is provided with a removable cap 6, which may, if desired, be removed for the purpose of filling the container with lubricant. The closed end of the container 5 and the cap 6 are each provided with a fitting or nipple 7, the end of which is flanged over as shown at 8 to provide a seat for a valve comprising the leather or fibre disc 9 and the metal disc 10. This valve is yieldingly held against its seat by means of the compression spring 11 which is confined between the metal disc 10 and the pin 12, which passes transversely through the fitting, and the ends of which project beyond the sides of the fitting for the purpose which will later be referred to.

A piston comprising the oppositely disposed cup leathers 13 and the two face plates 14, which are all held together by means of suitable rivets 15, is slidably mounted in the container 5 and serves to divide the container into two separate chambers or compartments, one of which is adapted to receive lubricant, and the other is adapted to receive a compressible fluid, preferably air.

For conducting the lubricant from the container 5, I provide a flexible conduit 16 of well known construction, one end of which is provided with a coupling member comprising the plug 17 having the annular flange 18 which is received between the inner end of the sleeve 19 and the collar 20, so that the sleeve 19 can rotate freely upon the plug 17. Resting upon a shoulder 21 formed in the bore of the sleeve 19 is an annular disc 22 which carries the outwardly projecting tube 23, the outer end of which is preferably bevelled as shown at 24 and provided with a plurality of notches 25. A cup leather 26 is yieldingly held in engagement with the outer end of the plug 17 and the walls of the sleeve 19, so as to provide a seal between these two members by means of a compression spring 27, which is confined between the disc 22 and a metal washer 28 in the bottom of the cup leather.

Surrounding the outer end of the tube 23 is a second cup leather 29, having a washer 30 in the bottom thereof. This cup leather is normally held against a shoulder 31 formed by reducing the diameter of the outer end of the bore of the sleeve 19, by means of the compression spring 32 which is confined between the annular disc 22 and the washer 30. The outer end of the sleeve 19 is provided with a pair of bayonet slots 33, the outer portions of which are preferably inclined, as shown in Figure 2, for receiving the projecting ends of the pins 12 of the nipples 7. When the coupling member just described is positioned in registry with one of the nipples or fittings, and then pushed over the fitting, the cup leather 29 first contacts with the outer end of the nipple or fitting and subsequently thereto the end of the tube 23 contacts with the disc shaped valve of the fitting, and presses it inwardly against the pressure of the lubricant in the container, whereupon lubricant will pass outwardly through the nipple or fitting and the tube 23 into the flexible conduit 16, which conducts it to a nipple or fitting which is to receive lubricant. It will be noted that the contact between the cup leather 29 and the end of the fitting takes place before the opening of the valve in the fitting, thereby establishing an initial seal between these two elements which prevents the escape of lubricant when the valve in the fitting is subsequently opened by the pressure of the tube 23. The cup leather 29 and its washer 30 fit loosely around the tube 23, so that lubricant can have access to the space in the rear of the cup leather, and inasmuch as the lubricant is under pressure, it will tend to press the cup leather 29 even more tightly against the end of the nipple, thereby effectively preventing any leakage of lubricant.

Any suitable coupling member 35, such for instance, as that disclosed in the patent to E. W. Davis, No. 1,401,765, December 27, 1921, may be used at the other end of the flexible hose 16 for successively making connection with the nipples or fittings 36 secured to the bearings of the mechanism to be lubricated, as for instance the bearing 37. This coupling member is provided with a valve which is closed when the coupling member 35 is detached from the fitting, but which is opened in the act of making connection between the fitting and the coupling member. It is not necessary to the success of my invention that means be provided for making a positive mechanical connection between the fitting and the coupling on the outer end of the conduit 16, as it is possible to make use of coupling members of well known construction in which sealed contact between the fitting and the coupling member is maintained by manual pressure. If desired, a valve may be interposed between the container and the fitting for manually controlling the rate at which lubricant is supplied to a bearing. Such constructions are well known and require no further description.

It will, of course, be understood that when a cartridge comprising a container 5 having a charge of lubricant in one end and a charge of compressed fluid or gas in the other end, is connected with a fitting 36 by means of a flexible conduit 16 and a coupling member 35, the compressed gas will expand in the container 5, thereby discharging lubricant from the opposite end of the container to the flexible conduit, the coupling member 35 and into the fitting. When sufficient lubricant has thus been discharged, the operator can then detach the coupling member 35 from the fitting, thereby causing the valve in the coupling to close and preventing further discharge of lubricant from the cartridge.

The container 5 can be charged with lubricant in at least two different ways. In the first place, the cap 6 can be removed from the container after the air remaining therein has been discharged by pressing inwardly upon the nipple connected to the end of the container containing the air. This can be accomplished by making use of any instrument for pushing inwardly upon this valve so as to allow the air to escape past the same, or the container can be charged with lubricant without discharging any of the air from the opposite end thereof, by connecting the nipple at the lubricant end of the container with a suitable compressor adapted to force lubricant under pressure into the container.

In Figure 1, I have illustrated one embodiment of a compressor which can be used for charging the containers 5 with both lubricant and air. This compressor in general comprises a suitable base member 40, having a depression 41 formed in the upper side thereof, which depression is bounded by a seat 42 adapted to make a sealed joint with the open end of the lubricant container 44. The bottom of this inverted container is provided with an air vent 45 which is normally closed by means of the follower 46. A vertical extension 47 projects upwardly from one side of the base member 40, and has formed therein a vertically extending bore 48, the lower end of which is enlarged as shown at 49 to provide a valve seat 50. A leather or fibre disc valve 51 is yieldingly held upon the seat 50 by means of a compression spring 52 interposed between the valve and the inner end of the nipple 53, which is threaded into the lower end of the enlarged portion 49 of the bore. The valve 51 is provided in its periphery with a plurality of longitudinally extending grooves 54 permitting the discharge of lubricant or air, as the case may be, along the sides of the valve. The upper portion of the bore 48 is connected with the depression 41 by means of a passageway 55 formed in the extension 47 and the transversely extending chamber 56, through the three-way plug valve 57, which is provided with the handle 58 and which can be turned so as to connect the chamber 56 with the recess 41 through the passageway 55, or to connect the chamber 56 with the air inlet port 59, as shown in Figure 1. A plunger 60 is slidably mounted in the upper end of the bore 48 and can be reciprocated by means of the lever 61, one end of which is pivotally mounted upon a pair of brackets 62 projecting upwardly from the extension 47 and the link 63, one end of which is pivotally connected with the lever 61 intermediate its ends, and the other end of which is pivotally connected with the outer end of the plunger 60.

A flexible discharge conduit 64 is connected with the discharge end of the nipple 53 and carries at its free end a coupling member 65 of the same construction as that shown in Figure 3.

By connecting the coupling member 65 with the fitting of one end of the container 5, as shown in Figure 1, and with the valve 57 in the position shown therein reciprocation of the plunger 60 will cause air to be pumped into one end of the container 5. If the coupling 65 is connected with the fitting 7 at the other end of the container 5, and if the valve 57 is then shifted so as to establish communication between the passageway 55 and the chamber 56, upon reciprocation of the plunger 60 grease will be pumped into the container 5. It is immaterial which end of the container is first filled, although if grease is first pumped into the container, the space left for air may be too greatly reduced. It is preferable first to pump air into the cylinder, and to then charge it with lubricant. Pressure gauges may, if desired, be used for determining the pressure in the container.

The compressor described above is, with the exception of the valve 57 and the port 59, substantially the same as that described and claimed in the co-pending application of Fesler, Davis, and Frier, Serial No. 634,945, filed April 27, 1923. While this compressor may be used for the purpose described, it is to be clearly understood that two compressors, one for air and one for lubricant, may preferably be used for the purpose of charging the containers 5.

One of the objects of my invention, as stated above, is to provide an article of manufacture in the form of a cartridge comprising a container 5, having therein a charge of lubricant and a charge of compressed air or fluid, and provided with means for discharging the lubricant when the cartridge is properly connected with a bearing to be lubricated. Such cartridges can be sold by service stations equipped with a suitable compressor or compressors for charging the cartridges. When the contents of a cartridge has become exhausted, the user can return the container to the service station and receive a charged container or cartridge, upon payment merely for the lubricant and the service. The cartridges can be made large enough to contain a considerable quantity of lubricant, so as to make frequent exchanges unnecessary for the owner of a single car or other mechanism to be lubricated.

I have disclosed no means, such as safety valves, fusible plugs, etc., for insuring safety in the event such cartridges are exposed to undue pressures caused by heat or otherwise, as such expedients are well known to those skilled in this art and require no description.

While I have described the details of the preferred embodiment of my invention, it is to be clearly understood that my invention is not limited to these details, but is capable of other adaptations and modifications within the scope of the appended claim.

Having thus described my invention, what I claim is:

Means for supplying lubricant to a bearing, comprising a cylindrical container having a piston therein, and a coupling member at each end of said container, said coupling members each comprising means for making detachable connections with a third coupling member.

In witness whereof, I hereunto subscribe my name this 20 day of July, 1923.

EARL F. PIERCE.